United States Patent [19]
Ballestrazzi et al.

[11] Patent Number: 4,881,357
[45] Date of Patent: Nov. 21, 1989

[54] PACKAGING MACHINE FOR THE CONTINUOUS PACKAGING OF PRODUCTS HAVING A VARIABLE SIZE

[75] Inventors: Aris Ballestrazzi; Lamberto Tassi, both of Savignano Sul Panaro, Italy

[73] Assignee: Sitma-Societa Italiana Macchine Automatiche, S.p.A., Spilamberto, Italy

[21] Appl. No.: 223,915

[22] Filed: Jul. 25, 1988

[30] Foreign Application Priority Data
Aug. 27, 1987 [IT] Italy ................ 21732 A/87

[51] Int. Cl.⁴ ............................................. B65B 9/02
[52] U.S. Cl. ........................................ 53/64; 53/553; 53/228
[58] Field of Search ............ 53/64, 76, 228, 553, 53/229; 198/343

[56] References Cited
U.S. PATENT DOCUMENTS 3,618,740 11/1971 Tavern ................. 53/553 X
4,019,307 4/1977 Ballestrazi ............. 53/553 X
4,313,288 2/1982 Tassi ..................... 53/553 X
4,382,405 5/1983 Buttner .................. 198/343 X Primary Examiner—John Sipos
Attorney, Agent, or Firm—Hedman, Gibson, Costigan & Hoare

[57] ABSTRACT

A packaging machine suitable for the continuous packaging of products, or of groups of products having a different shape and size in height, wherein, thanks to a particular combined movement of the transversal welding unit, both of sinking down towards the product, and of accompanying of the same product during the welding step, relatively to a car for its essentially horizontal shift, a quick and correct packaging of the products is obtained, even very different as regards the length in the direction of advancement of the packaging film, besides as regards the height, with the consumption of the packaging material being minimized to the strictly necessary amount, and the continuous packaging after each other being made possible of products or of product groups, having mutually different dimensions.

12 Claims, 4 Drawing Sheets

PACKAGING MACHINE FOR THE CONTINUOUS PACKAGING OF PRODUCTS HAVING A VARIABLE SIZE

The present invention relates to a continuous packaging machine for the continuous packaging of products having a variable size.

Packaging products or groups of products on packaging machines which are provided with a lower conveyor unit, above which the product to be packaged is made run and is fed towards a transversal welding unit, is known.

Under said welding unit, the product, once that the conveyor belt is stopped, is welded wrapped inside the packaging film, after which the again re-started conveyor unit carries out the final discharge of the packaged material towards a heat-shrinking oven, or towards a side longitudinal welding unit of the package before the possible heat-shrinking suitable for individuating a correctly done package. It clearly appears that this type of packaging causes a time waste owing to the stop, with the consequent loss of production and limited packaging speed.

A first solution of the problem had been proposed by causing the products to continuously advance on a closed-loop conveyor belt constituted by a silicone-treated material, above which the upper welding element acted, with a vertical motion being supplied to the same upper welding element by means of a pneumatic piston. In this way, the same belt, besides acting as a conveyor means, performed the function of counter-welding element, or lower welding element, and made it possible the packaging to be carried out in a nearly continuous way, but causing the serious problem of the considerably large consumption of wrapping material, which increased, above all, when the product to be packaged had a rather considerable size, e.g., when it was a parcel of the height of a bottle, or when it even was a group of bottled.

Another solution was given by proposing lower conveyor means provided with counter-welding elements positioned at a constant pitch from each other, on which a welding element sinks, by being pushed by a pneumatic piston. In both above-said solutions, there was hence a downwards-movement time and an upwards-return movement time, which was strictly a function of the speed of the pnuematic device which drove the welding element, and a non-constant welding time, because it had to match tthe different speeds, and the descent of the welding element and the same welding step had to be correlated to the products continuously fed after each other.

All said systems known from the prior art, by being a combination of mechanical movements and of pneumatic movements, require continuous adjustments, when the speeds are changed, as well as when the product to be packaged is changed, and inasmuch as the mutual enslaving of the various operating units is very complex, misadjustments are very likely to occur.

A further solution to the problem was given, but unfortunately for packaging machines for low-thickness products only, by using transversal welding units installed on board of a car, and vertically movable, so as to be supplied with a movement of elliptical type, which makes it possible a certain saving in packaging material to be achieved, but does not reach a valid solution of the initial technical problem, which is that of minimizing the amount of wrapping thermoplastic material needed in order to wrap the materials to be packaged, independently from their size, above all, from their height.

The purpose of the present invention is on the contrary the solution of said problems in a continuous packaging machine, in such a way as to make it possible the stop times due to the transversal welding, or even to a possibly necessary and carried out longitudinal welding, to be annulled, with the productivity and the packaging rate being increased.

This purpose according to the present invention is achieved by providing a packaging machine for the continuous packaging of products having a variable size, of the type comprising a framework fitted with conveyor means for conveying the products to be packaged, a transversal welding unit for the transversal welding of a plastic material having the form of a continuous sheet suitable for wrapping said products to be packaged, wherein said continuous-sheet material is fed by a couple of bobbins positioned on relevant unwinding units and free ends of said bobbins are transversely welded so as to form a single continuous sheet, with said conveyor means being a first conveyor belt and a second conveyor belt respectively positioned upstream and downstream said welding unit, which is transversal relatively to the direction of unwinding of said packaging material and which is composed by an upper, vertically movable, welding bar, and by a lower welding bar, stationary, and positioned at the same level as of said first conveyor belt and second conveyor belt, with relevant motor means and actuator means being furthermore provided, characterized in that said wleding unit is positioned on a horizontally translatable car, with said car bearing, on opposite sides relatively to said welding unit, a return roller of said first conveyor belt and a return roller of said second conveyor belt, wherein said first conveyor belt and said second conveyor belt run along a closed-loop path and are provided with a belt tightening device suitable for enabling them to correctly operate, a centralized motor means being provided, which, through a first transmission, determines the continuous revolution of said conveyor belts, and, with the interposition of a brake-clutch unit, selectively actuated by sensor means monitoring the position of said products on said conveyor belts, drives an intermediate shaft to revolve in order to actuate a cam for the vertical movement of said upper welding bar and for actuating a crank and slotted link for driving the horizontal reciprocating of said car.

The structural and functional characteristics and the advantages of a packaging machine according to the present invention will be better understood from the following exemplifying and non-limitative disclosure, referred to the hereto attached drawings, wherein.

Figure 1:
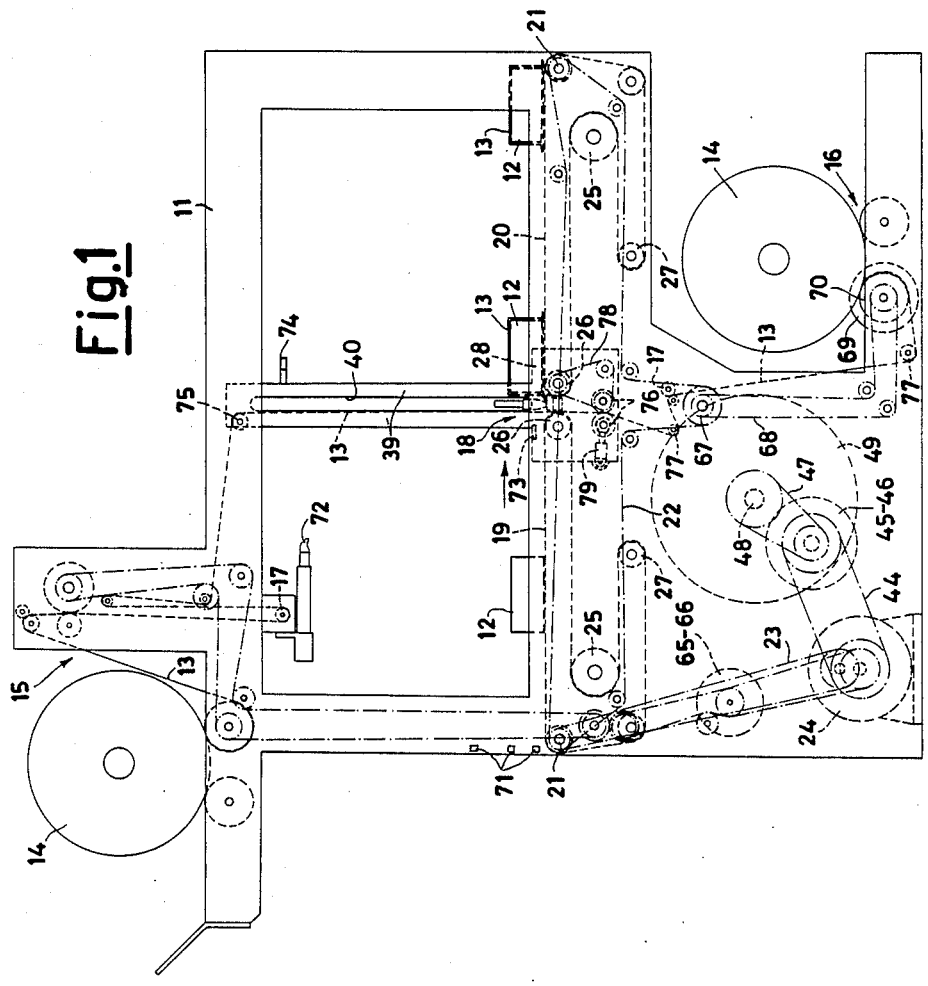
FIG. 1 shows a side elevation view of a packaging machine, wherein the film path with the relevant unwinding units, and the drive mechanisms driving the conveyor belts are shown.

Referring to the drawings, a continuous packaging machine according to the present invention comprises a framework, generally indicated by the reference numeral 11, on which a plurality of operating units—the transversal welding unit, the product conveyor units, the drive units, the unwinding units for unwinding the continuous wrapping material, and so forth—are installed, which are such as to make it possible individual products, or groups of products to be packaged in continuous, with said individual products/groups of products being indicated by the reference numeral 12, and having a size, both in height and in length, which may vary relatively to one another, and are fed after each other according to a whatever order, such as books, newpapers, magazines, bottles, containers, parcels, and the like.

As depicted in the figures, a wrapping or packaging material 13, such as, e.g., a continuous heat-shrinking plastic film, is fed by a couple of bobbins 14 respectively positioned on an upper unwinding unit 15 and on a lower unwinding unit 16, fitted with compensating means 17, such as so-said "dandy rolls", which make it possible the same film 13 to be constantly and continuously, parallelly fed to a transversal welding unit, generally indicated by the reference number 18, which constrains it around the product 12, cutting it and welding it in correspondence of the leading edge and of the trailing edge of said product 12 (FIG. 1).

The product 12 is in fact fed in a known way by means of a conveyor belt (not shown in the figures) above a first conveyor belt 19 installed upstream said transversal welding unit 18 and is subsequently made advance towards a second conveyor belt 20 installed downstream said transversal welding unit 18. Both said conveyor belts 19, 20 run along a closed-loop path and are caused to revolve by a couple of drive rolls 21, linked with each other by a chain transmission 22, and driven by a transmission 23, also of chain-transmission type, driven by a main centralized motor-speed variator unit 24, which is suitable for supplying the movement to all the operating units of the packaging machine.

Figure 2:
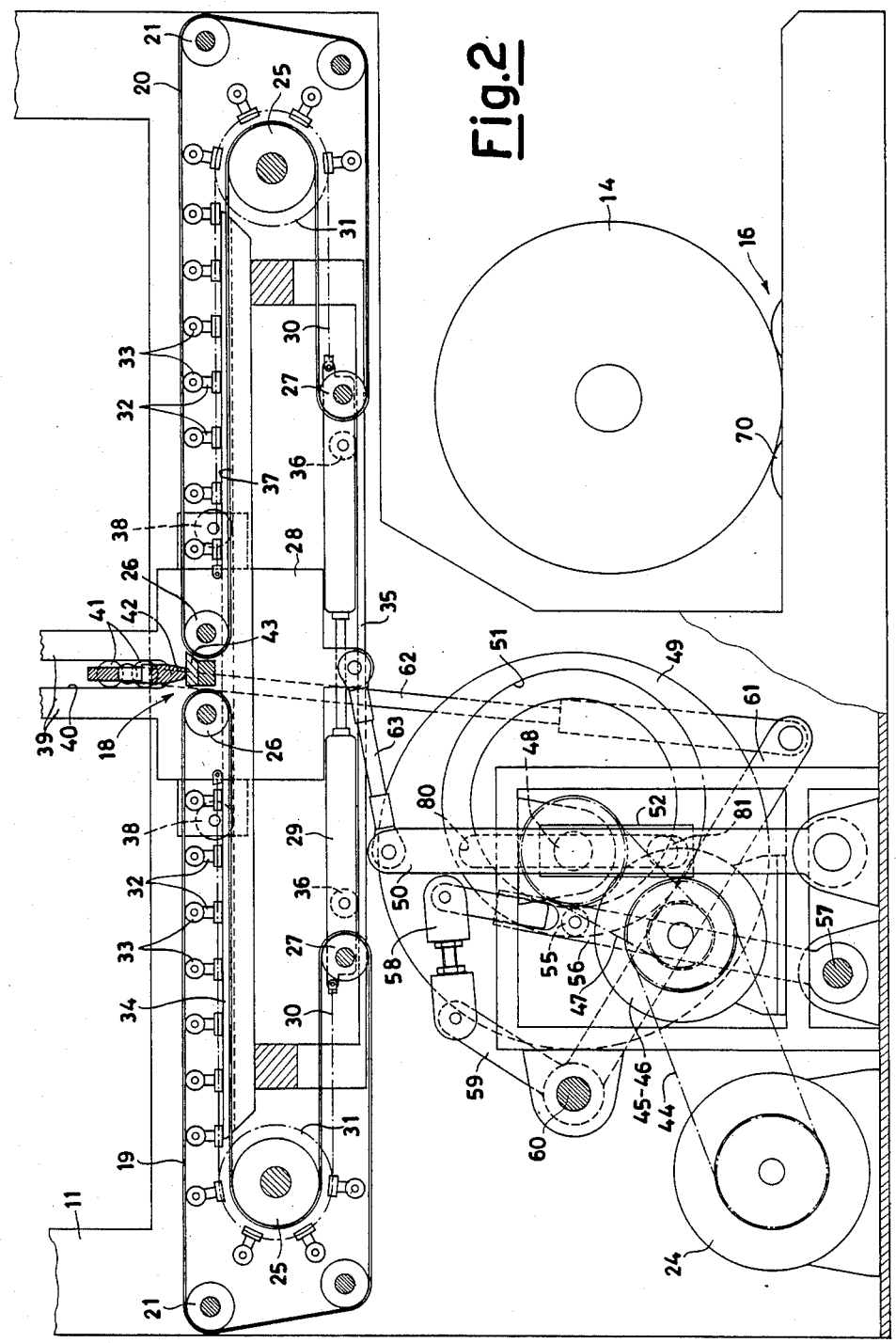
FIG. 2 shows a magnified longitudinal sectional view of the machine of FIG. 1 in its welding position.
Figure 3:
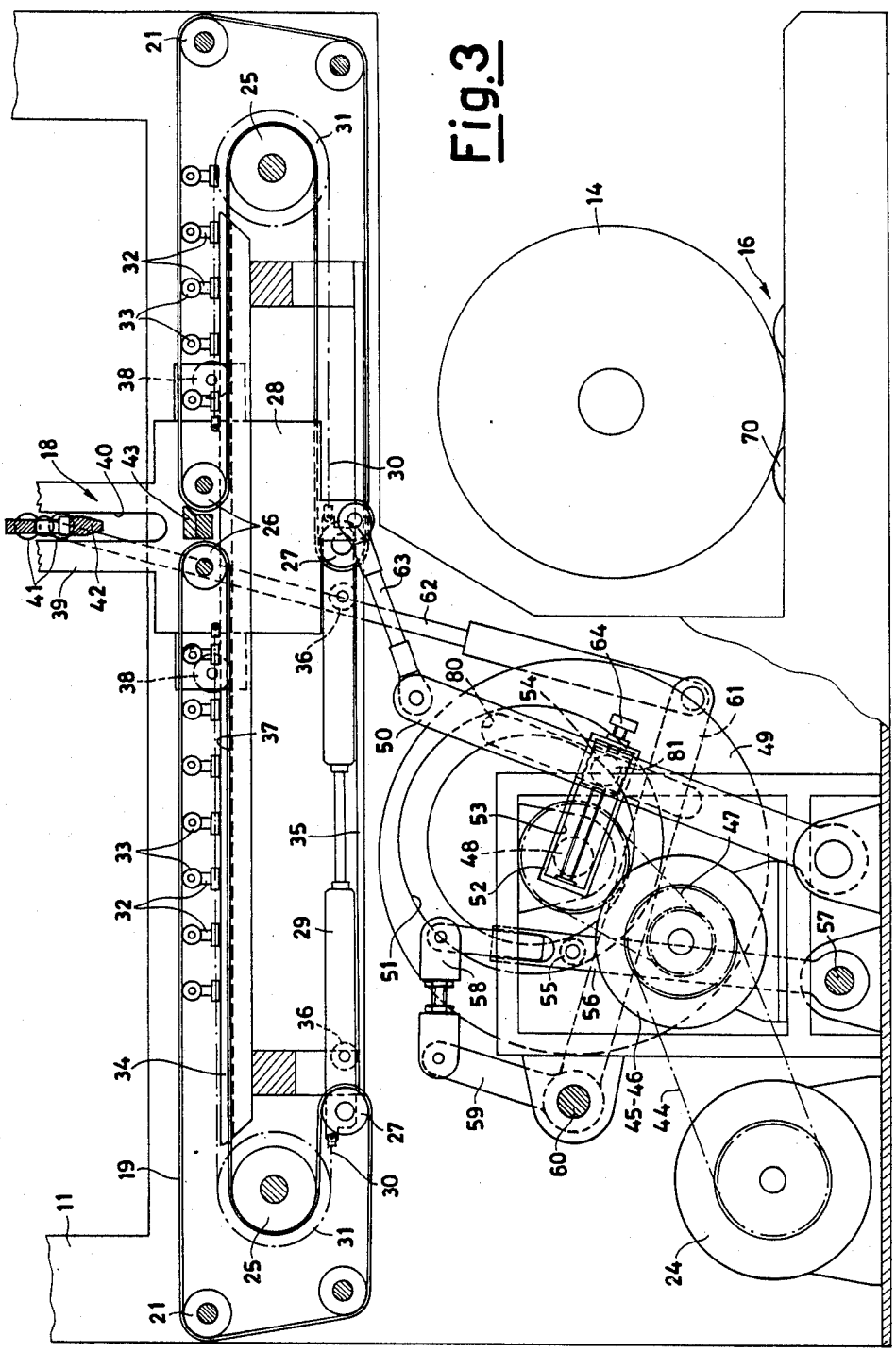
FIG. 3 shows a magnified longitudinal sectional view equivalent to that of FIG. 1, in a different operating position.

The conveyor belts 19 and 20 have a mutually specular shape, run along an essentially trapezoidal path and the mutually opposite sides of both paths show a "C"-shaped recess individuated by a stationary return roll 25 fastened to the framework 11. At the ends of said sides of said "C"-shaped recess, two further rolls 26 and 27 are positioned, which are horizontally movable relatively to the framework 11. In fact, the upper roll 26 is integrally rotatable relatively to a central car 28, on which said transversal welding unit 18 is mounted, whilst the lower roll 27 is integrally rotatable relatively to a tightening device 29, so designed as to link both said lower rolls 27 of both conveyor belts 19 and 20 (FIG. 2). Such a tightening device 29 connects the lower end of two chain portions 30 which, after running around two sprocket wheels 31 axially positioned relatively to the stationary rolls 25, are constrained to the central car 28, at the top thereof, nearly in correspondence of the upper rolls 26.

A plurality of supports 32, constrained to the chain portions 30, bear an equal number of rolls 33 constituting a roller apron on which upper portions of both conveyor belts 19 and 20 slide in the area wherein the product 12 are fed. The chain portions 30 slide on a flat guide 34 which is integral with the framework 11; also integral with the framework 11 is a further flat guide 35 on which the tightening device 29 is guided by means of rolls 36 integral with it. The framework 11 furthermore supports further flat guides 37 on which support rolls 38 slide, which are integral, at the bottom, with the central car 28, so that also said central car 28 can horizontally translate.

The central car 28, which can horizontally reciprocate, is provided with shoulder portions 39, which extend upwards and through which slots 40 are provided, inside which support rolls 41 slide, which support the opposite ends of an upper welding bar 42 vertically movable inside said slots, which, together with a lower welding bar 43, stationary relatively to the central car 28, constitutes the above-said transversal welding unit 18.

Inside said shoulder portions 39 and said same car 28, the film 13 is made run (FIG. 1), according to a vertical direction parallel to the direction of movement of the welding bar of the transversal welding unit 18. Said film is continuous, in that the film coming from the upper bobbin, and the film coming from the lower bobbin have been previously made integral with each other by means of a transversal welding.

More precisely, the film 13 coming from the upper bobbin 14, once that it has left the upper unwinding unit 15, is guided by a return roll 75 between the shoulder portions 39 of the car 28 towards a calender 76 which drives the film being unwound from the lower bobbin 14 made revolve by the lower unwinding unit 16 and positioned under the upper rolls 26, and it too on board of the central car 28, and made revolve by a transmission 78 integral with the upper roller 26 of the second conveyor belt 20.

The above said calender 76 acts as a means for guiding, driving and unwinding the film 13, which comes from the lower unwinding unit 16 and is deviated towards it by return rolls 77 integral with the framework 11 of the machine (FIG. 1), and is engaged on the same film by means of actuator means 79, e.g., constituted by a cylinder, controlled by suitable sensor means which are disclosed in the following.

The lower welding bar 43, which is positioned in the area of separation of the two conveyor belts 19, 20, has its upper surface approximately at the same level as of the same belts, but in such a way as to enable the so-generated continuous film coming from the upper unwinding unit 15 and from the lower film-driving calender 76, to run through.

The horizontal reciprocating movement of the central car 28, as well as the vertical movement of the upper welding bar 42 are determined in a purely mechanical way according to a certain law deriving from the particular structure given to a cam-crank and slotted link unit coupled with relevant levers which transmit the relevant motion to the upper welding bar, and to the welding unit supporting car, which furthermore makes it possible the upper, inner, mutually-opposite ends of both conveyor belts to be shifted.

In fact, exiting from said centralized motor-speed variator unit 24 (FIG. 1), a toothed belt 44 transmits the movement to a reduction gear 45, with the interposition of a brake-clutch unit 46. Furthermore, a small transmission 47, e.g., a chain-type transmission, drives a main intermediate shaft 48 to revolve, from the ends of said main intermediate shaft 48 the revolutionary motion being taken, which drives a cam 49 which controls the movement of the upper welding bar 42 and respectively the movement of a swinging crank and slotted link 50 for the horizontal reciprocating of the central car 28 (FIG. 2).

The main intermediate shaft 48 is integral, at an end, with the center of a disk-cam 49, which is provided with an eccentrically-positioned groove 51; and at its other end, said main intermediate shaft 48 is integral with an eccentric lever, i.e., a crank 52; with a pin 54, which drives the swinging lever, i.e., the crank and slotted link, 50, being suitable for being radially positioned inside a groove 53 provided in said crank 52. The position of said pin 54 inside the groove 53 is adjustable relatively to said main intermediate shaft 48.

Now, examining at first the drive of the upper welding bar 42, one can observe that inside the eccentric groove 51 of the disk-cam 49 an idle roll 55 is inserted, which protrudes from an intermediate portion of a swinging lever 56, which is hinged, in correspondence of its lower end, in 57, and at its other end bears an articulated, adjustable lever 58. Said articulated lever 58 is linked in its turn to a drive lever 59 keyed on a reciprocating shaft 60 which bears, at its opposite ends, a couple of levers 61 which drive the movement of the upper welding bar 42, and are linked to said upper welding bar 42 by means of respective tie-rods 62, each of which incorporates a shock-absorber mechanism, not shown in the figures, in order to optimize the transversal welding of the wrapping film 13.

The crank 52, installed at the other end of the intermediate shaft 48, by causing the pin 54 to rotate, causes the crank and slotted link 50 to swing; with such crank and slotted link 50 the central car 28 is articulatedly linked by means of an adjustable tie-rod 63, which central car 28 being thus caused to reciprocate. The crank and slotted link 50 is provided with a groove 80, inside which a runner or pad element 81, positioned on the end of said pin 54, can slide. As said, the pin 54 can be shifted in an adjustable way inside the groove 53, e.g., by means of an adjustment screw 64, so that the length of the stroke of the central car 28, or, better, the amplitude of its reciprocating movement, can be changed as desired, with varying lengths of the product to be packaged. In this way, by adequately adjusting the length of the stroke of the car 28 which bears the welding unit 18, the speed thereof can properly match the speed of the conveyor belts with varying product lengths.

The upper unwinding unit 15 is driven by a kinematic transmission which draws the motion directly from the outlet end of the centralized motor-speed variator unit 24, with a speed reduction gear 65 and a brake-cluth unit 66 being interposed (FIG. 1).

On the contrary, the lower unwinding unit 16 draws its motion from a sprocket wheel 67, which interacts with the chain transmission 22 which drives the driving rolls 21 of the conveyor belt 19 and of the conveyor belt 20. Said sprocket wheel 67 drives a chain 68 which, with the interposition of a coupling 69, causes an unwinding roll 70 to revolve in order to unwind the lower bobbin 14, whenever necessary.

Together with these devices of essentially mechanical type, suitable sensor elements are provided in the machine, which control and correlate the various movements of the packaging machine, so as to cause it to perfectly and correctly operate, in particular acting on the movement of the man car, and on the movement of the upper welding bar, in order to achieve the purpose of the invention. For example, at the inlet side of the machine, a first set of photocells 71, vertically positioned on the framework 11, is provided (FIG. 1), which detect the arrival of the product, or of the products 12, defining the size in height thereof, and consequently presetting a time (relevant, e.g., to a "low", to a "medium" or to a "high" product), for the actuation of the upper unwinding unit 15. The welding cycle is then started by a second photocell 72, which is preferably positioned on the same plane as of the first conveyor belt 19. In fact, said first conveyor belt is preferably composed by two conveyor belts placed side-by-side to, and spaced apart from, each other, wherein, in an area of separation thereof along their adjacent sides, an upwards-facing receiver element (not shown in the figures) for said photocell 72 is positioned.

A third photocell 73 is also positioned in the area between said two side-by-side belts of the first conveyor belt 19, in the nearby of its end outlet portion and, once that it detects the arrival of the leading edge of the product, starts, by means of the intervention of the cylinder 79, the engagement of the drive calender 76 on the film 13, thus enabling the plastic film 13 to wrap on both the upper and lower sides and product made advance by the conveyor belts 19 and 20 and possibly, with the drive calender 76 being only disengaged when the trailing edge of the product is detected.

Of course, the lower unwinding unit 16 determines the unwinding of the film from the lower bobbin 14 when the relevant compensator means 17 command the coupling 69 to engage, so as to make the unwinding roll 70 revolve.

Finally, a fourth photocell 74 can be furthermore and optionally provided, which is positioned beyond the area of separation between the two conveyor belts 19, 20, or, better, at the inlet end of the second belt 20 and above it on the framework 11, which, by detectng the trailing edge of the passed and packaged product, controls the perfect prosecution of machine's operation and allows sich prosecution. The provision of said sensor elements or photocells allows the operation of the packaging machine according to the present invention to be easily understood.

In fact, as hereinabove said, a conveyor means feeds reciprocate.

Figure 4:
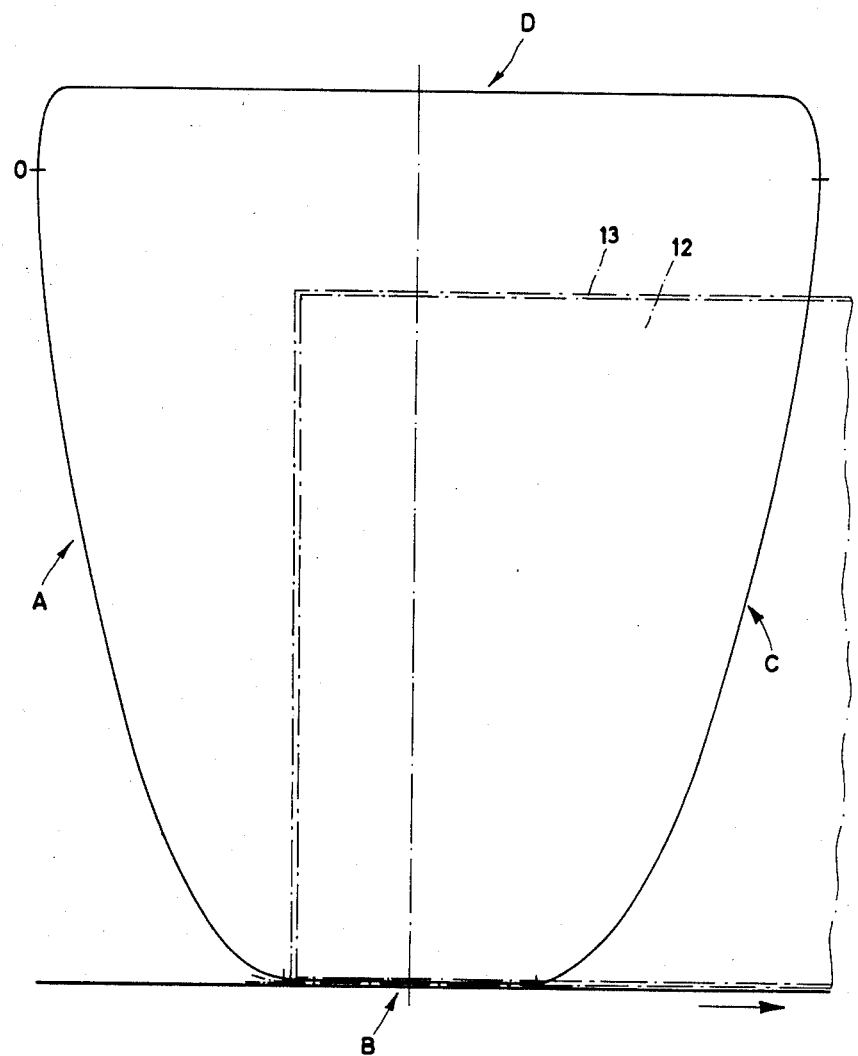
FIG. 4 is a chart showing the combined motion of the welding unit and of the car.

In FIG. 4, the combined movement which derives from the above is depicted; one can observe that the (A) step of approachng of the welding bar towards its position of engagement with the material to be packaged, the (C) step of removal, and the (D) step of the car return are rather fast, whilst the (B) step of accompanying during the welding step is slower. By the "O" character, the point relevant to the stand-by position, at which the welding cycle starts, is indicated, and in chain a portion of the film-wrapped product is also indicated, wherein the minimizing in wrapping film consumption can be observed.

It should be observed that the (A) step, and the (C) step, respectively of approaching and of removal of the welding bar, take place on a nearly vertical direction, with the welding unit travelling in the same direction of advancement as of the conveyor belts, still in order to minimize the consumption of the packaging film. According to a generic and exemplifying formulation, the whole cycle could be subdivided, as regards the total revolution angle, into three angles of approximately 100° each, for the first three (A), (C) and (D) steps, and an angle fo 60° as regards the last (B) step, of accompanying during the welding step. The combination of the movements of said cam and of said swinging crank and slotted link makes it possible a combined movement to be obtained, which is determined in a completely mechanical way, essentialy comprising a step of approaching of the welding bar towards said products wrapped inside said packaging material, an accompanying step during the welding step, a removal step, and a step of quick return to the stand-by position, and representable by means of an upside-down isosceles trapezium with inclined, curved sides.

The important point is that during the (B) step of accompanying during the welding step, the central car 28 horizontally moves in such a way that its motion, causing a change in length of both portions of conveyor belts 19 and 20 in correspondence of the rollers 33 which constitute the so-said roller apron, makes it possible the own movement of the belts 19, 20 to be equated, so that the transversal welding unit 18 remains closed for the necessary time for a correct welding of the wrapping film to be obtained. This is the so-said "slow step" of the welding cycle. The movement of the conveyor belts 19 and 20 in order that the upper portions thereof facing towards the product may vary relatively to each other, and consequently the underlying roller aprons which support them may vary as well, is possible, because, as said, the upper rolls 26 translate together with the car 28, by being integral with it, whilst the lower rollers 27 are made integral with the tightening device 29 and with the chain portions 30, and exactly move in the opposite direction to the direction of displacement of the upper roll 26 positioned on the same side, and nearly at the end of the same chain portion 30.

In fact, one could consider that the two chain portions 30, the tightening device 29 and the lower body of the central car 28 constitute a closed loop which can move around both idle, coaxial sprocket wheels 31, free of rotating relatively to the stationary rolls 25, revolutionary and integral with the framework 11. In this way, inasmuch as the upper, movable welding bar 42, positioned in a nearly ridge-fashion on the upwards extending shoulder portions 39, is driven by a cam-driven movement, and inasmuch as with this movement the movement is combined of the car 28 which supports the welding unit, driven by a swinging crank and slotted link, a combined movement of sinking of the wleding bar, and of accompanying of the product with the car during the welding step, derives, which, by realizing the transversal welding precisely in the nearby of the product, makes it possible a saving in the amount of the plastic material used for the packaging to be obtained, with an as small amount thereof as possible being consumed. Precisely the arrangement of the welding bar in a bridge-position, the possibility of actuating the cycle of welding at the trailing edge of the product, and the detection of the height of the product being packaged make it possible the above-said optimization in packaging film consumption to be achieved, independently from the height of the product, or of the products to be packaged, with any stop times being got rid of.

Advantageously, it should be observed that in a machine according to the present invention, inasmuch as the transversal welding unit 18 can be turned on at the end of the same product 12 by means of the intervention of the photocell 72, products of any lengths can be packaged.

We claim:

1. Packaging machine for the continuous packaging of products having a variable size, of the type comprising a framework fitted with conveyor means for conveying the produts to be packaged, a transversal welding unit for the transversal welding of a plastic material having the form of a continuous sheet sduitable for wrapping said products to be packaged, wherein said continuous-sheet material is fed by a couple of bobbins positioned on relevant unwinding units and free ends of said bobbins are transversely welded so as to form a single continuous sheet, with said conveyor means being a first conveyor belt and a second conveyor belt respectively positioned upstream and downstream said welding unit, which is transversal relatively to the direction of unwinding of said packaging material and which is composed by an upper, vertically movable, welding bar, which moves in a transit describing an inverted trapezoid and by a lower welding bar, stationary, and positioned at the same level as of said first conveyor belt and second conveyor belt, with relevant motor means and actuator means being furthermore provided, characterized in that said welding unit is positioned on a horizontally translatable car, with said car bearing, on opposite sides relatively to said welding unit, a return roller of said first conveyor belt and a return roller of said second conveyor belt, wherein said first conveyor belt and said second conveyor belt run along a closed-loop path and are provided with a belt tightening device suitable for enabling them to correctly operate, a single centralized motor means being provided, which, through a first transmission, determines the continuous revolution of said conveyor belts, and, with the interposition of a brake-clutch unit, selectively actuated by sensor means monitoring the position of said products on said conveyor belts, drives an intermediate shaft to revolve in order to actuate a cam for the vertical movement of said upper welding bar and for actuating a crank and slotted link for driving the horizontal reciprocating of said car.

2. Packaging machine according to claim 1, characterized in that said first conveyor belt and said second conveyor belt have a mutually specular shape and run along an essentially trapezoidal closed-loop path, wherein mutually opposite sides of said two paths show each an essentially "C"-shaped recess individuated by a roll fastened to said framework, and by an upper roll and a lower roll which are positioned in correspondence of ends of said sides, with said upper roll being said return roll constrained to said car, and said lower roll of each recess also being a return roll positioned in correspondence of ends of said tightening device.

3. Packaging machine according to claim 2, characterized in that ends of said tightening device are fastened to chain portions, which run around sprocket wheels coaxial with said stationary rolls, and at their other end are fastened to said car, nearly in correspondence of said upper return rolls.

4. Packaging machine according to claim 3, characterized in that on said chain portions a plurality of supports are constrained, which bear rolls defining a roller apron on which portions of said first conveyor belt and of said second conveyor belt slide.

5. Packaging machine according to claim 4, characterized in that said car, said chain portions and said tightening device are capable of horizontally sliding on guides integral with said framework.

6. Packaging machine according to claim 1, characterized in that said cam for the vertical movement of said upper welding bar comprises a disk, positioned integral on said intermediate shaft, provided with an eccentric groove inside which an idle roll is inserted, which extends from a swinging lever, hinged relatively to said framework at one of its ends, and articulatedly linked at its other end to an articulated lever for said vertical movement of said upper welding bar.

7. Packaging machine according to claim 1, characterized in that said swinging crank and slotted link comprises a crank, installed at an end of said intermediate shaft, and provided, inside a groove it is fitted with, with a pin radially positionable in an adjustable way relatively to said intermediate shaft, with said pin rotatably supporting a slider or pad element which enters inside a groove provided in a crank and slotted link lever which is articulated at one of its ends in a swinging way relatively to said framework, and which drives, by means of a tie-rod, said car to horizontally reciprocate.

8. Packaging machine according to claim 1, charcterized in that said unwinding units are operatively linked, by means of relevant transmissions, to said centralized motor means with the inteposition of a second brake-clutch assembly as regards the upper unwinding unit, and with a drive calender, which can be brought into its position of engagement of the said film by means of a relevant actuator means, besides a coupling, as regards the lower unwinding unit.

9. Packaging machine according to claim 8, characterized in that said first conveyor belt comprises two mutually side-by-side, mutually spaced-apart belts, in order to provide, along their adjacent sides, a positioning area for one of said sensor means, which is destined to detect the trailing edge of the product to be packaged, and is operatively connected with said brake-clutch unit coupled with said cemtralized drive means.

10. Packaging machine according to claim 8, characterized in that on said framework of said first conveyor belt a set of sensor means are provided, which are suitable for detecting the height of said products, accordingly presetting a time for the actuating of said second brake-clutch unit of said upper unwinding unit.

11. Packaging machine according to claim 8, characterized in that in the nearby of, and upstream, said welding unit, a further sensor means is positioned, which detects the incoming product on said first conveyor belt, and actuates said driving calender of said first lower unwinding unit to engage said film, and keep it engaged until the trailing edge of the same product.

12. Packaging machine according to claim 1, characterized in that the combination of the movements of said cam and of said swinging crank and slotted link makes it possible a combined movement, determined in a completely mechanical way, to be achieved, which essentially comprises a step of approaching of the welding element towards said products wrapped inside said packaging material, a step of accompanying during the welding, a step of removal and a step of quick return to the stand-by position, and is representable by means of an outline having the shape of an upside-down isosceles triangle with curved inclines sides.

* * * * *